US006903840B1

(12) United States Patent
Maymin et al.

(10) Patent No.: US 6,903,840 B1
(45) Date of Patent: Jun. 7, 2005

(54) ADVANCED ADMINISTRATION FUNCTIONS FOR COPIERS AND PRINTERS ON A NETWORK

(75) Inventors: Marina Maymin, Rochester, NY (US); David L. Salgado, Victor, NY (US); Therese F. Leni, West Henrietta, NY (US)

(73) Assignee: Xerox Corporation, Stamford, CT (US)

(*) Notice: Subject to any disclaimer, the term of this patent is extended or adjusted under 35 U.S.C. 154(b) by 877 days.

(21) Appl. No.: 09/694,965

(22) Filed: Oct. 24, 2000

(51) Int. Cl.[7] .......................... G06F 15/00; G03G 15/00

(52) U.S. Cl. ..................... 358/1.15; 358/1.15; 358/296; 399/80; 399/83

(58) Field of Search ................................ 358/1.15, 296, 358/1.1; 399/80, 18, 83; 709/20, 219; 707/3, 9, 10

(56) References Cited

U.S. PATENT DOCUMENTS

| | | | | | |
|---|---|---|---|---|---|
| 5,694,222 | A | * | 12/1997 | Yamada | 358/296 |
| 6,064,839 | A | * | 5/2000 | Nakamura | 399/80 |
| 6,266,693 | B1 | * | 7/2001 | Onaga | 709/219 |
| 6,697,806 | B1 | * | 2/2004 | Cook | 707/10 |

* cited by examiner

*Primary Examiner*—Kimberly Williams
*Assistant Examiner*—Saeid Ebrahimi-Dehkordy
(74) *Attorney, Agent, or Firm*—R. Hutter

(57) ABSTRACT

In an administrative program controlling a plurality of printers and copiers, an administrator is provided with a matrix whereby different billing requirements can be associated with different discrete functions, such as printing, scanning, faxing, and finishing, within a single machine. The administrator is provided with options to control the behavior of the machine when required billing codes are not entered,such as holding image data relating to a requested job in a machine until the required billing codes have been entered.

13 Claims, 3 Drawing Sheets

FIG. 3
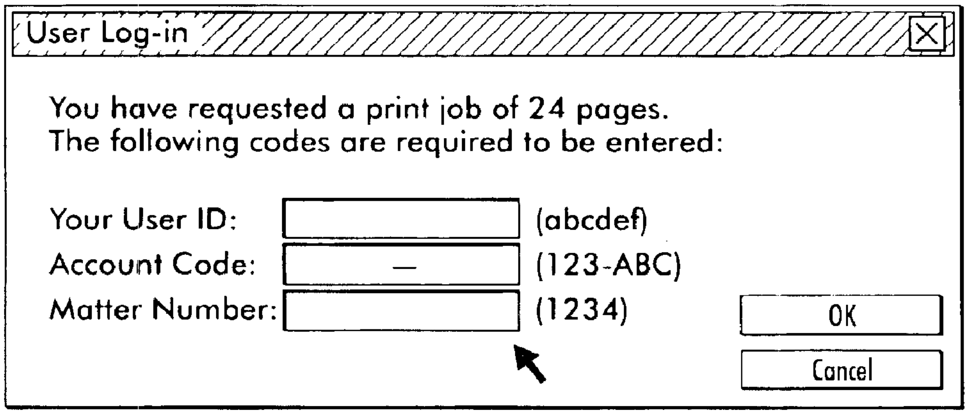
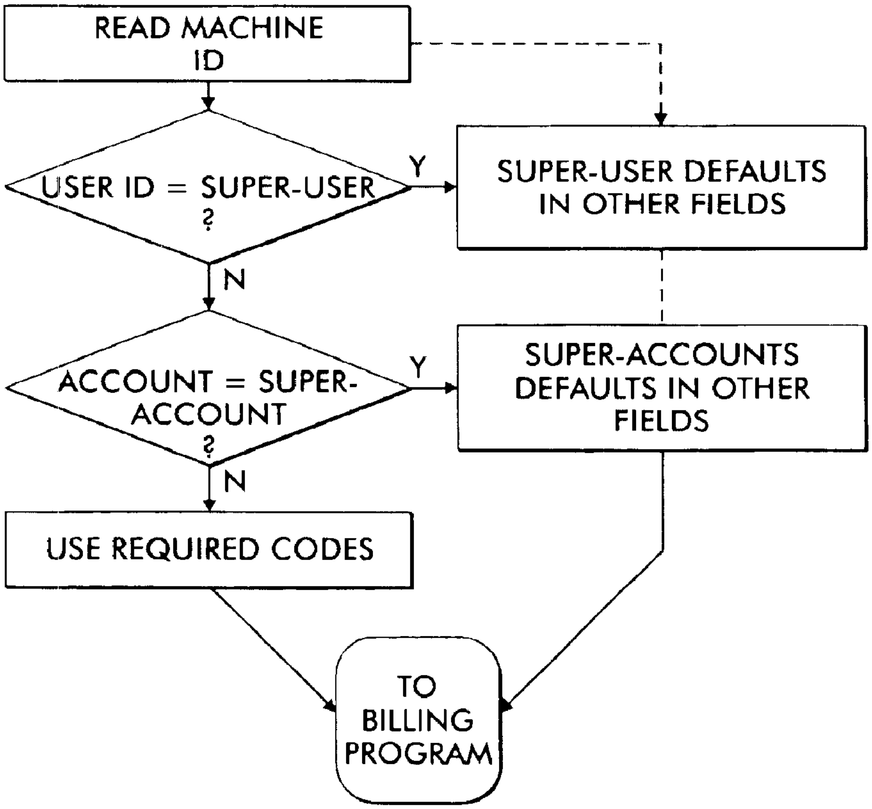
FIG. 4

ADVANCED ADMINISTRATION FUNCTIONS FOR COPIERS AND PRINTERS ON A NETWORK

FIELD OF THE INVENTION

The present invention relates to a system for administrating the use of various types of office equipment, such as printers, copiers, and facsimiles, which are connected over a network.

BACKGROUND OF THE INVENTION

In the office equipment industry, it is common that different types of office equipment, such as copiers, printers, and facsimiles, exist on a network in order to communicate with various computers. In the case of a printer or digital copier, image data often originates at a computer and is communicated over the network to the copier or printer. In addition to basic functions, administrative functions relating to the office equipment take place over the network as well. A key administrative function in any office is the apportionment of billing for the various functions performed by various machines. If a selected printer within a large office outputs a certain number of prints, it is desirable to assign the cost of the printing either to the human user who requested the prints, to a particular client of the office for whom the prints were made, and/or to a particular job being fulfilled for the client. In other words, it is desirable to assign costs of various activities, such as printing or copying, either by user, by customer, by job, by another category, or by a combination of these categories.

At the same time, in certain office situations, it is desirable to make occasional exceptions to a standard billing policy. It may be desired to permit certain functions of certain equipment to be unbilled, such as short jobs in machines at certain locations. It may be desired to permit a color-capable printer to output monochrome prints free to the user, while requiring billing for color prints. Also, in a realistic office situation, the necessary user, client, and job ID's may not be easily available to a user at the time the job is requested. It may be desirable to allow jobs to be output without entry of the necessary billing information, and allow the billing information to be submitted after the job is done.

The present invention relates to a flexible system for administrating a plurality of office equipment machines, enabling a system administrator to specify what types of billing information are required for each of a variety of machines, and also specify, to individual machines in a system, what the machine should do when the required billing information is not entered at the time of job submission.

DESCRIPTION OF THE PRIOR ART

U.S. Pat. No. 5,694,222 discloses a system for controlling access to various office equipment machines on a network. As can be seen in FIGS. 6A–D and 7of the patent, there is displayed to an administrator a matrix in which the administrator can select, for each machine, the level of password protection for individual functions in the machine. For instance, as shown in FIG. 7, the administrator can require entry of a password number for color prints, while allowing monochrome prints to be made without a password.

SUMMARY OF THE INVENTION

According to one aspect of the present invention, there is provided a method of administrating a plurality of machines, each machine capable of performing at least one function selected from a group of functions comprising printing, copying, finishing, scanning to a memory, sending a facsimile, and receiving a facsimile. For each function available from a selected machine of the plurality of machines, there is selected at least one type of code required for using the function. For a desired function at the selected machine, a request for entering a code of the type of code required for using the function is displayed. The machine carries out a preselected course of action if the code required for using the function is not entered.

BRIEF DESCRIPTION OF THE DRAWINGS

FIG. 3 is an example of a screen which would be displayed when a print job is desired, according to the present invention; and FIG. 4 is a simple flowchart illustrating one aspect of the present invention.

DETAILED DESCRIPTION OF THE INVENTION

Figure 1:
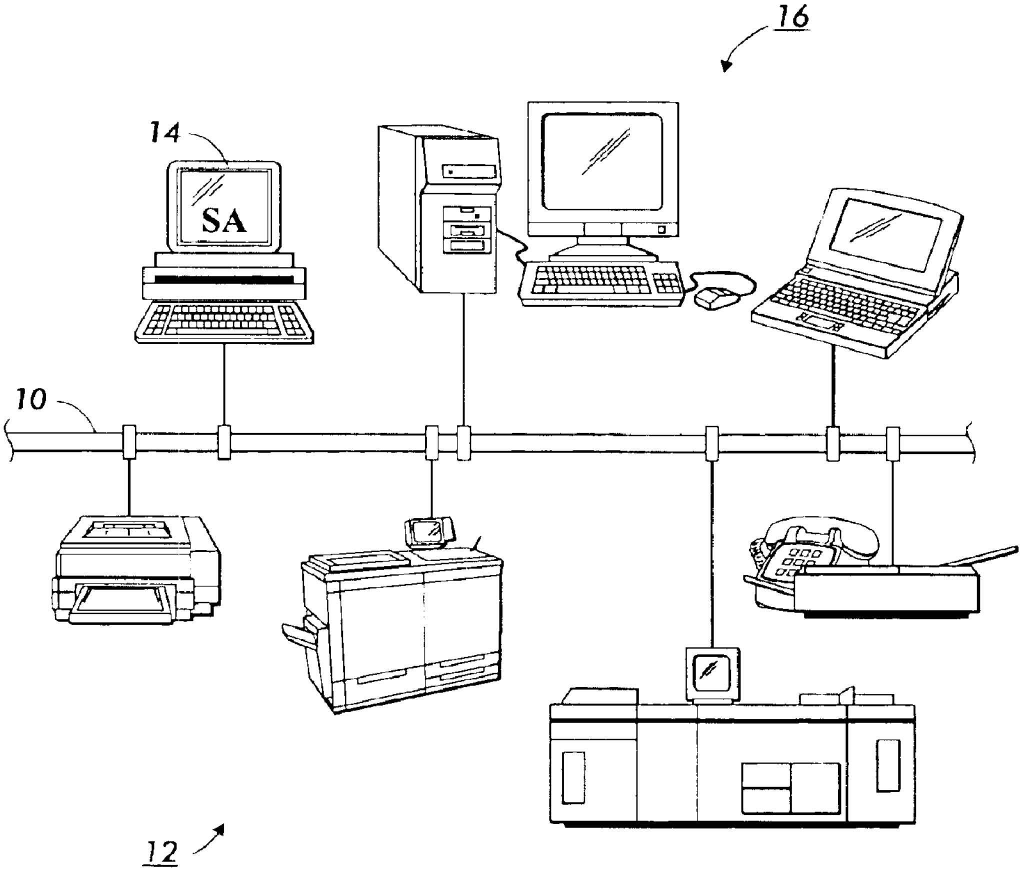
FIG. 1 is a diagram showing the relationship of various computers, including an administrator computer, with various types of office equipment on a network.

FIG. 1 is a diagram showing the administration of various types of office equipment, such as copiers, printers, scanners, and facsimiles (in general, "machines") which communicate to other equipment through network protocols generally known in the art. Over a particular network 10 may communicate any number of machines such as generally indicated as 12, which, as shown, can include printers, copiers, facsimiles, scanners, etc. It should be noted that, in the current market of office equipment, individual machines may each provide multiple functions: for example, a "digital copier" can function as a copier, a printer, and possibly a scanner or facsimile as well. Further, a color-capable machine, such as a color printer, is typically able to output monochrome prints as well. The machines 12 communicate over network 10 either with each other, or with one or more computers which also exist on the network. For purposes of the present discussion, there exists on the network an "administrator computer" indicated as 14, as well as any number of additional computers 16. The various computers such as 14 and 16 can interact appropriately with any particular machine on the network, such as to submit print jobs, send or receive facsimiles, and receive image data from scanners.

The administrator computer 14 is used to control administrative functions relating to the various machines on the network. As such, the administrator computer 14 is able to access particular control programs within each machine 12, to send or receive service messages. According to the present invention, a system administrator at administrator computer 14 is able to control the billing requirements of individual functions within individual machines 12 on the network 10.

Figure 2:
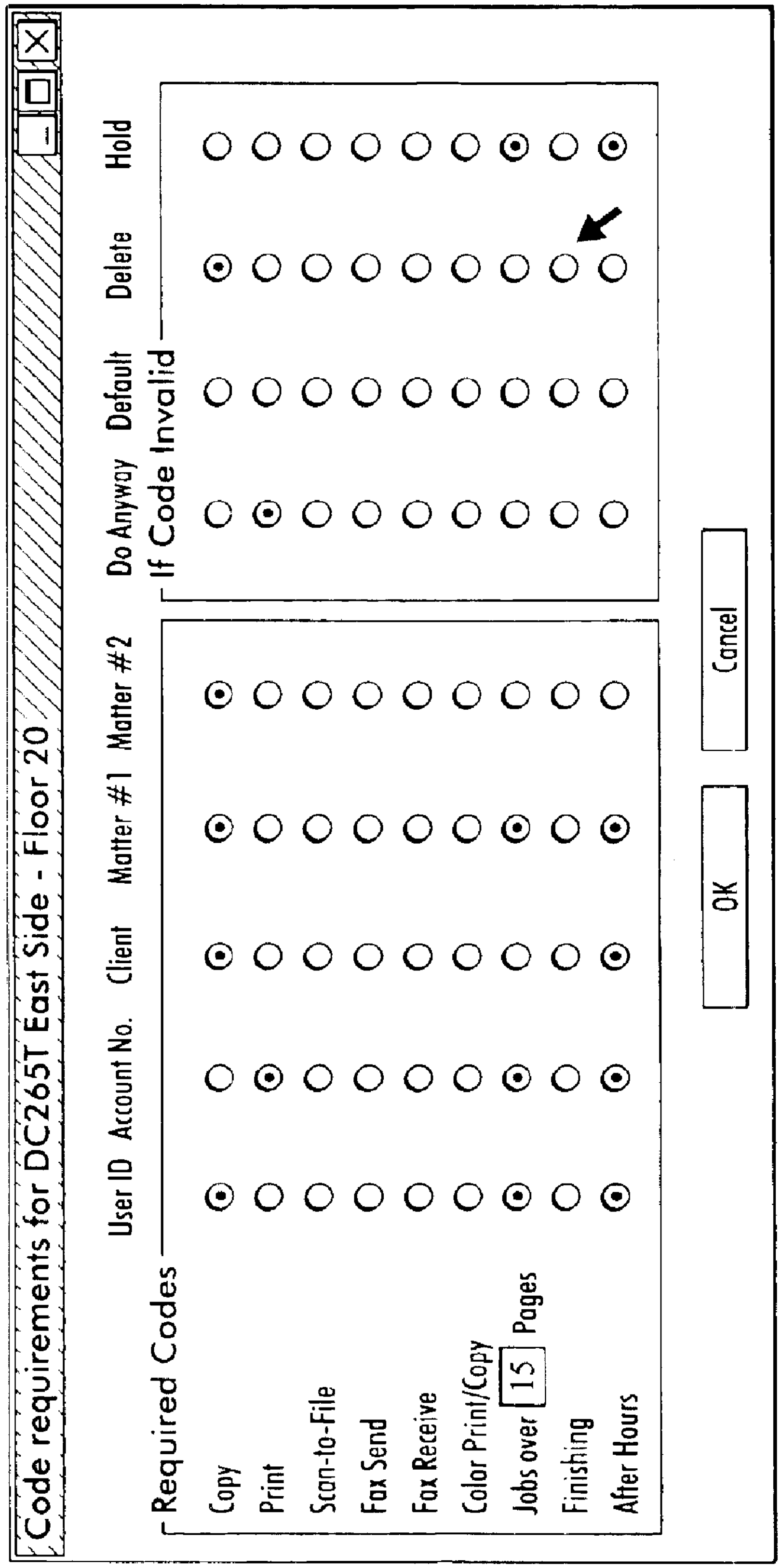
FIG. 2 is an example of a screen which is displayed to a system administrator to control individual office equipment functions, according to the present invention.

FIG. 2 is an example of a "window" which is displayed to a system administrator on administrator computer 14. The particular window shown in FIG. 2 relates to the functions of one particular machine 12 on a network 10: for an administrator at computer 14 to control the billing functions of multiple machines, there will typically be provided any number of icons or file names, one icon or file name relating to each individual machine 12 available to the administrator, and the administrator selects the icon or file name of a particular machine the administrator would like to control. When the icon or file name is selected, a window such as shown in FIG. 2 is displayed to the administrator for the particular machine.

With particular reference to the window shown in FIG. 2, it can be seen that the window displays a matrix on the administrator computer. Along the left 20 side of the matrix is a list of functions which a particular selected machine 12 may be capable of. For example, a simple monochrome printer would be capable of only the "print" function, but a digital copier may be capable of not only the "copy" function, but printing (that is, outputting image data at that originates from a computer), scanning to a file in the memory of a particular computer, as well as other functions. A facsimile which is controllable over the network 12 will typically have a fax send function, a fax receive function, and conceivably a scan to file function as well. A color printer or copier on the network is typically able to output not only color copies or prints, but monochrome copies or prints as well. Also shown is a function of outputting, incidental to a particular job, a certain threshold number of pages: the administrator can enter a number of pages which distinguishes a large job from a small job. Also, there may be available for a particular machine advanced finishing functions, such as binding or booklet making, and access to these may require billing. Further, there may be higher standards for billing requirements after business hours, and discrimination by time of day may be displayed as a selectable option, as shown. In a preferred embodiment of the present invention, a window associated with a particular machine will display only those functions which the particular selected machine is physically capable of providing (for instance, a machine that lacks a scanner would not be able to do copying or scanning), with the unavailable functions possibly being grayed out in the left column.

Across the top of the matrix in FIG. 2 is a list of possible billing codes that may conceivably be required to access a particular function on a particular selected machine: these particular codes, such as user ID, account number, client, matter #1, matter #2, as shown under the heading "required codes." Typically, at least one of these possibly required codes relates to a user of the particular machine (in the claims, a "user ID"), while another required code relates to an account relevant to the particular job being requested by the user (in the claims, a "billing code"). This code relating to an account could identify a client of the office to whom the bill should ultimately be related to, or a particular job associated with a particular client. According to a preferred embodiment of the present invention, there may be displayed for selection any number of types of codes which may need to be entered into a particular machine for obtaining a particular function thereof. The window shown in FIG. 2 specifies codes for a user, an account, and a client, as well as to miscellaneous matter numbers: however, according to a particular implementation, any number of variations on the general concept are possible, and provision can be made (in further windows, not shown) for customization of the column headings.

The matrix in FIG. 2 includes a check box at every intersection of a function of a machine with a selectably required code. By selecting a particular check box, such as with a mouse, the administrator can select which types of billing are required for different functions. Thus, for example, for a print job to be performed by a selected machine, the administrator can select that at least a user id, and account number, and a client number, are required. If the administrator wants to allow the jobs of, for instance, fewer than 10 pages to be allowed to be output without entry of a billing code, the administrator can check the desired check boxes in the "jobs over --- pages" row, and enter the number 10 in the space, while leaving the check boxes in the print row blank. Similarly, if the selected machine is color-capable, the administrator, by selecting the right combination of check boxes, can require a certain set of codes under doubly-specific conditions, such as requiring billing codes for all color jobs, or any jobs over a certain number of pages, with monochrome jobs below a certain number of pages being permitted without entering any codes. By providing this two-dimensional matrix between machine functions and selectable required codes, a high degree of billing specificity is facilitated by the present invention.

Further to the right in the window shown in FIG. 2, there is shown further options (in the claims, "courses of action") which effectively instruct the particular selected machine what to do if a particular function is requested by user, but not all the necessary codes have been entered. In the illustrated embodiment, these options are "do anyway," "use default codes," "delete the job," or "hold the job," although variations on these basic concepts are possible. By providing these options for the cases in which the required codes have not been supplied by the user, yet another dimension of administrator controls over a selected machine is possible. Depending on a particular office situation, automatic billing may not be crucial, and therefore the "do anyway" option may be desirable. In other situations, having a machine supply default codes for missing codes may be feasible, although variations on the default code concept will be described in detail below.

With regard to the "delete job" and "hold job" options shown in the window of FIG. 2, these options relate to the fact that most types of office equipment, particularly printers and digital copiers, must temporarily retain image data in some form before outputting in the data in the form of images on paper. Even a scanner used to submit data to a memory in a computer retains data temporarily, and of course a facsimile scans and prints data to and from a memory. If, under certain conditions, a "delete job" option is selected for a particular function, if the necessary required codes are not entered incidental to the job being requested, then the image data is either deleted from a particular memory, or never retained in a memory to begin with; in such a case, the image data relevant to the job must be resubmitted, along with the mandated billing codes, in order to a complete the job successfully.

In the case of the "hold job" option, if a particular function is requested without at least one of the required codes being entered, the image data relating to the job can nonetheless be retained in a memory at the particular machine selected for use. This image data can be retained in the machine in any number of forms: in the case of printing, the image data can be retained its basic PDL format, such as in PCL or Adobe® PostScript™, or alternately can be decomposed by the printer and held in an uncompressed or lightly compressed form for essentially immediate submission to printing hardware once the necessary codes are entered. The image data can similarly be held in situations where some functions are authorized while other functions are not. For instance, if the system administrator has selected that basic printing functions can be performed without a certain code, but access to advanced finishing options, such as booklet making or using deluxe cover stock, require a particular code, a print job may be submitted to the machine which is suitable for printing but not for finishing. In such a case, a design option is to permit the machine to decompose the image data and retain it temporarily but not output sheets until the appropriate codes are entered for finishing, or the finishing option request is withdrawn.

With the "hold job" option, provision is made (such as in further windows, not shown) for allowing the administrator to specify how long data is retained at a particular machine in expectation of receiving all of the required billing codes. This retention period, which depends highly on the overall capacity of a system relative to its user population, can conceivably range from an hour to several days. After the particular time for retaining data is expired, the machine can either delete the data, or simply allow the data to be overwritten within a buffer memory. Indeed, it is conceivable that a system can be set up wherein certain users or accounts, as identified by an input user ID or account numbers, can be given longer or shorter image data holding times than others.

FIG. 3 is an example of a request for entry of user ID and other account-related codes which would appear either at that a user interface, for a "walk up" job such as at a copier or facsimile, or alternately appear as a pop-up window after image data is submitted over the network to a particular printer. According to a preferred embodiment of the present invention, in order to avoid user confusion, only of those functions which are selected to require a particular entry of a code appear in the window for filling in by a user. In other words, if a particular type of code is not required for a particular situation, no window implying that such code should be submitted is displayed to the user. Of course, which particular code requests are displayed the user will depend on of the particular function desired by a user at the time. In the case of printing from a computer, the code request will preferably appear right after it the job is sent to the printer; in the case of a copy or scanning job, the code request window can appear wherever a document handler is raised, or when originals are loaded into the document handler. Further according to a preferred embodiment of the present invention, the windows requiring entry of particular codes can include visual cues as to a desired format of the required information. For example, if a particular code is in an intended format of four letters followed by four numbers, the window can include a visual cue such as ABCD-1234, and so forth. Once again, further screens available to the administrator (not shown) can be used for such customization of the code requests.

As mentioned above, a selectable option for the administrator in cases where a particular function is requested from a machine but the necessary codes have not been entered is entering a predetermined default code in place of the code that was not entered, and running the job anyway. According to aspects of the present invention, this system of using default codes can be brought to a sophisticated level in order to meet the business requirements surrounding a particular system. In the most basic implementation of using default codes, if a job is requested and a particular code, such as the user ID, is not entered, a default code is read from a memory within administrator computer 14 and placed in the user ID field for billing purposes. A slightly more sophisticated system can make the particular default code for the user ID dependent on the identity of the particular machine being operated; the assumption being that, if the printer in Mr. X's office is being used, it is probably being used by Mr. X. Similarly, if the user ID is entered but no account number or a matter number is entered, default values for the account number or matter number can be selected based on a the user ID: once again, the assumption is that, because Mr. X usually works for account ABC, if Mr. X is using the printer, he is probably working on account ABC.

According to a particular aspect of the present invention, there may be provided, within administrator computer 14, provision to set up what can be called "super users," "super accounts," "super matters," and so forth. In the case of a "super user," who might be, for example, the owner of the company, submission of the owner's user ID may in itself enable unbilled access to all functions (or at least more functions than are normally available). A similar concept can attach to certain account numbers, wherein entry of certain account numbers enable access to certain functions which are not generally available. In either case, the particular properties of a super user or super account may depend on the machine ID of the particular machine being used, the machine ID being typically communicated to an administrator in a manner invisible to users whenever the machine is used. For instance, a particular super user, as identified by his user ID, may be permitted unbilled access to the one machine near his office, but would not enjoy such privileges with regard to other machines in the building. Setting up these super user and super account relationships with regard to particular machines could be made the subject of another matrix-type display similar to that shown in FIG. 2.

FIG. 4 is a simple flowchart showing the basic steps of implementing the super user or super account concept within a particular machine. First, the machine ID is read. When the job is requested, an entered user ID can be checked to see if the user ID is that of a super user, and if it is, the default codes can be entered into the remaining fields if they are not already filled with relevant data; once again, the particular default codes may be made dependent on a the machine ID of the particular machine being used. The same concept, as can be seen, can apply to the use of super account codes, super matter codes, and so forth.

In the above discussion of the present invention, a distinction must be made between entering codes purely for purposes of access, and entering codes relating to a final billing report. When mere access to a particular function within a machine is the only requirement, typically only a user ID would be necessary: either a particular human user is authorized to use a particular machine, or not. In the billing context, however, not only is the identity of the human user requesting a particular job relevant, but also the associated client and account codes, and any other metric may be relevant. These "accounting codes," as described in the claims, can be used to identify a user, a job, an account to which the job will be billed, and a matter to which the job is relevant, a particular client perhaps having a number of matters ongoing simultaneously. All of these account codes will eventually appear in one or another billing statement, either as a printed document or at the very least as a file in a computer memory. Thus, according to the present invention, a key step is organizing data relating to various jobs by a plurality of codes, not only a user ID, but by account, client, matter, and so forth. Also, within the billing context of the present invention, access in itself need not be restricted, as evidenced by the fact that the administrator can select the "do anyway" option when required codes are not entered. In other words, the present invention relates to a system of administrating the use of office equipment, such that individual jobs are properly billed to suitable entities; while this function may effectively overlap a restriction of access to certain machines, by the terms of the claims, the present invention is related to billing of functions and not purely access to functions.

What is claimed is:

1. A method of administrating a plurality of machines, each machine capable of performing at least one function on image data, selected from a group of functions comprising printing, copying, finishing, scanning to a memory, sending a facsimile, and receiving a facsimile, comprising the steps of:

selecting, for each function available from a selected machine of the plurality of machines, at least one type of code required for using the function;

for a desired function at the selected machine, displaying a request for entering a code of the type of code required for using the function; and the machine carrying out one preselected course of action of a plurality of selectable courses of action if the code required for using the function is not entered, one selectable course of action including the machine holding image data in a memory for a predetermined amount of time until a code for using the function is entered.

2. The method of claim 1, wherein the at least one type of code required for using the function is a billing code.

3. The method of claim 1, wherein the step of selecting at least one type of code required for using the function includes selecting as a first type of code a user ID, and selecting as a second type of code a billing code.

4. The method of claim 1, one selectable course of action including having the machine perform the function.

5. The method of claim 1, one selectable course of action including entering a default code instead of the required code.

6. The method of claim 5, wherein the default code is dependent on a machine code associated with the selected machine.

7. The method of claim 1, wherein the step of selecting at least one type of code required for using the function includes selecting as a first type of code a user ID, and selecting as a second type of code a billing code, and wherein the default code for the billing code is dependent on the user ID.

8. The method of claim 1, further comprising the step of displaying a set of selectable types of codes which can be required to use a function in a selected machine.

9. The method of claim 1, further comprising the step of displaying a set of selectable types of codes which can be required to use each of a plurality of functions in a selected machine, whereby a first set of types of codes may be selected to be required for a first function and a second set of types of codes may be selected to be required for a second function.

10. The method of claim 1, further comprising the step of for each of a plurality of functions available for a selected machine, displaying a set of selectable courses of action to be the preselected course of action if the code required for using the function is not entered, whereby a first course of action is related to a first function and a second course of action is related to a second function.

11. The method of claim 1, wherein the holding of image data includes holding decomposed image data.

12. The method of claim 1, wherein the holding of image data includes holding of image data until a requested finishing option is authorized.

13. The method of claim 1, further comprising displaying information about each of a plurality of machines, and a set of selectable courses of action for each machine.

* * * * *